United States Patent
Afsenius

[11] Patent Number: 6,025,957
[45] Date of Patent: Feb. 15, 2000

[54] IMAGE INTENSIFIER BINOCULARS

[75] Inventor: Sven-Åke Afsenius, Lidingö, Sweden

[73] Assignee: Simrad Optronics A/S, Oslo, Norway

[21] Appl. No.: 08/958,259

[22] Filed: Oct. 27, 1997

[30] Foreign Application Priority Data

Oct. 25, 1996 [EP] European Pat. Off. .............. 96850179

[51] Int. Cl.[7] ............................ G02B 23/12; G02B 23/18
[52] U.S. Cl. ........................... 359/400; 359/351; 359/407
[58] Field of Search ........................... 359/400, 353–357, 359/409, 351; 250/214 VT

[56] References Cited

U.S. PATENT DOCUMENTS

| | | | |
|---|---|---|---|
| 3,737,667 | 6/1973 | Babb et al. | 250/214 VT |
| 4,205,894 | 6/1980 | Filipovich et al. | 359/400 |
| 4,323,298 | 4/1982 | Brennan . | |
| 4,392,710 | 7/1983 | Rogers . | |
| 4,826,302 | 5/1989 | Afsenius | 313/524 |
| 5,229,598 | 7/1993 | Filipovich | 250/227.2 |
| 5,416,315 | 5/1995 | Filipovich . | |
| 5,455,711 | 10/1995 | Palmer | 359/353 |

FOREIGN PATENT DOCUMENTS 467278  6/1992  Sweden .

*Primary Examiner*—Jon Henry
*Attorney, Agent, or Firm*—Young & Thompson

[57] ABSTRACT

A image intensifier binocular, so-called goggle, of the type having only one image intensifier tube (2) is working with an effective diameter of its entrance photocathode (3) below 15 mm and therefore an objective (1) having an accordingly shortened focal length. This combination will substantially increase the depth of field of the goggle and also enable a design of smaller weight.

17 Claims, 1 Drawing Sheet

IMAGE INTENSIFIER BINOCULARS

BACKGROUND OF THE INVENTION

The present invention regards improvements in image intensifier binoculars, generally called night vision goggles. Such goggles exist, which have two image intensifiers, but the present invention is associated with the type which has only one image intensifier, preceded by an objective for viewing a scene and followed by a viewing optics, terminated with two eyepieces. A particularly advantageous construction of this kind is described in U.S. Pat. No. 4,826,302, where the optics is folded in order to make the device short.

Thus, the invention regards an image intensifier binocular of the type generally recited in claim 1.

DESCRIPTION OF THE RELATED ART

Typical for goggles is that they are generally carried like spectacles, in order to enable the carrier to move about and observe much like in daylight. It is also typical that goggles have unity magnification. Such goggles have now found widespread use, and much improvement has been invested as regards image intensifier tubes, which are nowadays practically always of the type having so-called microchannel plates, where image intensification is obtained by electron multiplication in capillary tubes, each creating a pixel point in the intensified image. Considerable work has been put down in making finer and finer capillaries and thinner tube walls. Quite good image qualities are therefore nowadays obtained, and there is already much satisfaction in particular for airborne applications. A general trend for improvement is towards larger diameter image intensifier cathodes, as this is seen as a practical way of increasing the number of available pixels.

However, there have been some dissatisfactions, particularly among land-based users, where soldiers sometimes prefer to use the goggles hand-held instead of headmounted. Interviews show that the goggles are frequently considered as extremely useful, particularly in stationary situations, but that there is a problem when the user is mobile, because of size and weight of the instrument, and the recurrent need to refocus. In fact, this may wholly occupy one hand fixed to the focusing device. This is impractical when, for example, the operator needs both hands for driving a vehicle or handling a weapon. This latter circumstance is due to the fact that the high speed lens needed for obtaining large gathering capacity, necessary due to dark conditions, has a very short depth of focus. Practically speaking, this may mean that only one target at a time can be in focus, the rest of the view being more or less out of focus. There is thus little use for the potential spatial resolution and large field of view of the goggle, where the view covers objects ranging from the feet of the user and up to the horizon.

SUMMARY OF THE INVENTION

It is therefore an object of the present invention to reduce this general depth of focus problem, making an image intensifier goggle more acceptable to carry for land users, making it lighter and with an improved depth of focus.

According to the invention, this problem is solved by providing an image intensifier binocular according to claim 1.

In prior art, the effective entrance and exit surfaces of the microchannel image intensifier tubes used have recently had a diameter of 18 mm minimum, with a tendency for high performance equipment utilizing tubes of even larger diameter. It is here envisaged, according to the invention, to do the opposite, i.e. use image intensifiers which have considerably less diameter and which will therefore necessarily have correspondingly less resolving power. Two advantages are apparent from this, namely, miniaturization that gives lower weight and greater handiness, and an improved depth of focus. Presently, a diameter of 12 mm is preferred. Compared to the standard size of 18 mm, this will give less than 50% of the number of image points (pixels) available with an 18 mm tube, using the same technique. From a practical standpoint, however, due to the enlarged depth of focus, this loss of pixels is compensated by the fact, that the scene viewed will contain many more focused picture elements than with an instrument utilizing the standard 18 mm tube.

The depth of focus depends upon the effective diameter of the photocathode of the image intensifier tube, amd this diameter is decisive for the objective diameter. Seen the other way round, this parameter interaction may be seen such, that the depth of focus is determined by the front diameter of the goggle objective, so that a smaller diameter gives improving depth of focus. In order to decrease this front lens without simultaneously reducing the relative aperture (F number) of the lens (and a reduction can hardly be accepted because of the darkness conditions), the focal length must be reduced, approximately in proportion to the lens diameter reduced, so that also the image diameter is reduced, assuming the same standard field of view (40–50°) is to be kept.

Calculations and practical tests prove that a goggle having a 12 mm intensifier tube and being designed around it, may be focused in such a way that a range from 5 meters to infinity can be viewed without resolution degradation, while a prior art goggle with 18 mm tube has a comparable range of only 10 meters to infinity. Practical tests confirm also that the small tube goggle is still quite useful without refocusing down to a nearest distance of one to two meters, whereas the 18 mm tube goggle less useful without refocusing, at such short distances.

It may seem a paradox, but is a fact, that although the reduction of effective cathode size of an image intensifier tube will certainly mean a corresponding reduction oavailable f image elements (pixels) as compared to a tube with larger effective cathode, the number of focused image elements at a certain moment is nevertheless and typically the same for the small tube, due to its superior depth of focus. This is immediately relevant for an operator on the move, who—without refocusing—wishes to watch his steps a couple of meters in front, while at the same time maintaining a clear view of a distant background.

Another advantage of the reduced size tube goggle is its small size, within the limits, of course, that the measure is man and man has in the mean 66 mm distance between the eyes, while the focusing knob and other devices of the goggle must be large enough for practical handling.

In order to obtain a goggle magnification of one and since this class of image intensifier tubes also have unity magnification, there must be made a calculation which takes into account the focal length of the objective, f(obj), that of the eyepieces, f(oc) and the magnification G of the eyepiece transport system. In order to obtain the magnification one, the formula $$f(oc)=G \times f(obj)$$

must be satisfied. A typical objective focal length f(obj) of a goggle having a <15 mm effective diameter image intensifier may be 15 mm, while the focal length of the eyepieces is preferably longer than that, something like 20 mm, in order to obtain acceptable eye relief and exit pupil diameter. The transport system would then be assigned a system magnification of G=20/15=1⅓ in such a case. Thus, the eyepiece focal length in a goggle according to the invention will generally be longer than that of the objective, in order to obtain good eye relief and exit pupil size.

It is envisaged, in further advantageous embodiments of the invention, to make the focusing movement of the objective (or sometimes part of the objective) relative to the entrance plane of the image intensifier working stepwise, e.g. in two steps, one for close up viewing (for controlling hand work) and another for distant objects.

To mount a magnifying teleconverter releaseably in front of the objective lens is known from prior art. (A teleconverter is comparable to a galileian field-glass.) A suitable such device, with a magnification 3×, may have a weight of of 150 g but typically more. Such a device mounted in front of the head, is a straining obstacle for the operator. On the other hand, with a device according to the invention, the weight of a corresponding teleconverter may typically be as low as one third (50 g). A prior art goggle would weight about 400 g alone, and a goggle according to the invention about 300 g, so the combinations would weight 550 g and 350 grams respectively. This weight reduction may be seen as a further advantage of the invention.

BRIEF DESCRIPTION OF THE DRAWINGS

The invention shall now be explained in relation to the non-restrictive exemplary embodiments shown in the Figures.

BRIEF DESCRIPTION OF THE PREFERRED EMBODIMENTS

Figure 1:
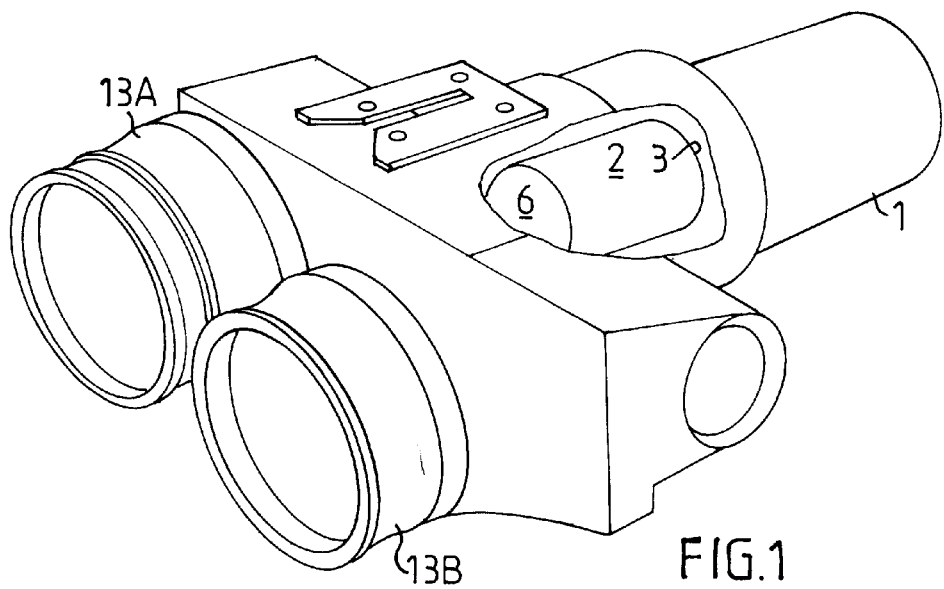
FIG. 1 shows a very general outlay of an image intensifier binocular in perspective and partly sectioned.

FIG. 1 shows generally and schematically the design of an image intensifier binocular of the prior art type which has only one image intensifier 2. A scene in front is focused upon the entrance surface 3 of the image intensifier 2, this image being intensified and presented upon exit surface 6. An optical transport system will transfer the image from the exit surface 6, via a beam splitter and mirrors (not shown) and the eyepieces 13A and 13B. This latter system is similar to a microscope.

Figure 2:
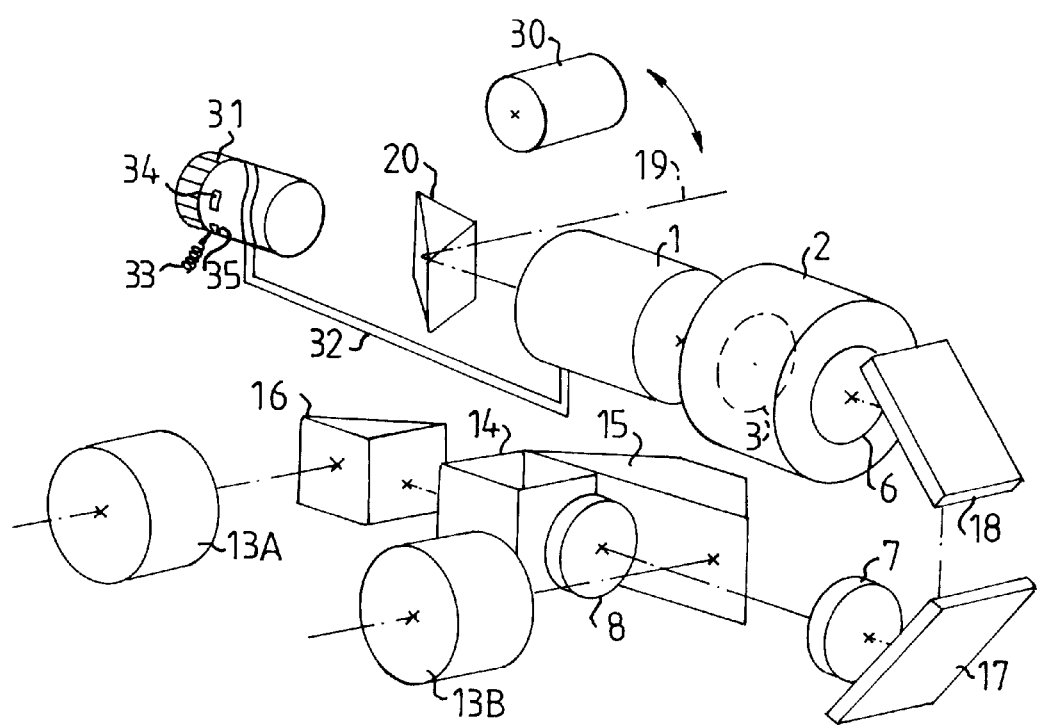
FIG. 2 shows a particular type.

FIG. 2 shows a modified and more compact type of image intensifier binocular, where the optical design has been considerably shortened. This design is described in U.S. Pat. No. 4,826,302. Also in this case, the same improvements are available by the invention, by decreasing the effective cathode diameter size of the image intensifier tube 2. Same reference figures are used as in FIG. 1, when applicable. As may be seen, the ray paths for the two eyepieces 13A and 13B are very different, the right eyepiece 13B receiving its image through lenses 7 and 8 and through the beam splitter 14 and "optical length-decreasing" prism 15, whereas the left eyepiece 13A receives its image through the same lenses but straight through the beam splitter 14. The ray path to the right eyepiece 13B involves two more reflexions than that of the left eyepiece 13A.

The new feature, according to the example of the invention, is that according to FIG. 2, the image intensifier 2 has an effective diameter of its entrance cathode, which is only <15 mm and the objective lens has a correspondingly short focal length of <15 mm, whereby is obtained the desired improvement of depth of focus. As already explained, the rest of the design (FIG. 2) will be correspondingly modified, ensuring suitable unity magnification set by the optical transport system (symbolized by lenses 7 and 8) and the eyepieces 13A, 13B.

The objective lens may be operated as a fixed focus device, but it is generally preferred to have adjustable focusing, for instance, as very schematically shown in FIG. 2, with a turnable knob 31 which by a cam curve and a follower 32 makes the objective slide. In view of the excellent depth of focus, it is preferred to arrange just two snap-in fixed-focus positions, as 34 and 35 cooperating with resilient means 33. One of those is then set so that the far end of the depth of focus is set at infinity, whereas the other one is for close distance, e.g. suitable for reading a map.

According to a preferred embodiment, a teleconverter with a magnification in between 2 and 3× is removably attachable in front of the objective lens and prism 20. Due to the small size of objective 1, this teleconverter can be small and light. It is preferred to mount it upon an arm in order to have it revolving in and out of the entrance window at 19 (not shown in the Figure). In order to obtain adequate focusing for this case, it is suitable to allow a certain breadth to the stop 34 mentioned, in order to enable additional fine focusing when using the teleconverter, which has a relatively poor great depth of focus.

It is clear that the invention can be used in modified form in many ways obvious to the man of the art. One such application would be to use an image intensifier of standard size, but with a short-focus objective lens and suitably adapted optics, enabling the diminishing of the effective diameter of the entrance cathode. Then, one can use an optic-fiber expander before the actual image intensifier cathode or utilize only part of the available diameter of this cathode, for example within a concentrical circle with a diameter of less than 15 mm.

I claim:

1. An image intensifier binocular with unity enlargement comprising a single image intensifier tube (2) provided with an entrance cathode (3) and an exit screen (6), an objective (1) in front of the entrance for focusing a scene thereon, an imaging system (7,8; 20) and two eyepieces (13A, 13B), the imaging system being arranged to create images of the said exit screen and which are viewable through said eyepieces, wherein the effective diameter of the entrance cathode is less than 15 mm.

2. An image intensifier binocular according to claim 1, wherein the objective (1) has a focal length that is shorter than the focal lengths of the eyepieces (13A, 13B).

3. An image intensifier binocular according to claim 1, further comprising an adjustment device for focusing its objective (1), wherein the adjustment device (31, 32) comprises a turnable knob provided with a click stop (35) for viewing at long distance and another click stop (34) for short distances.

4. An image intensifier binocular according to claim 3, wherein the click stop (35) for viewing at long distances has a positive width for enabling fine adjustment.

5. An image intensifier binocular according to claim 1, further comprising a removable teleconverter for entering into the entrance pupil of the objective (1).

6. The image intensifier binocular of claim 1, wherein the effective diameter of the entrance cathode is less than 13 mm.

7. The image intensifier binocular of claim 1, wherein the effective diameter of the entrance cathode is 12 mm.

8. The image intensifier binocular of claim 5, wherein the removable teleconverter is swingably fixed.

9. An image intensifier binocular with unity enlargement comprising a single image intensifier tube provided with an entrance cathode and an exit screen, an objective in front of the entrance for focusing a scene thereon, an imaging system and two eyepieces, the imaging system being arranged to create images of the said exit screen and which are viewable through said eyepieces, the effective diameter of the entrance cathode being less than 15 mm and an adjustment device for focusing its objective, the adjustment device comprising a turnable knob provided with a click stop for viewing at long distance and another click stop for short distances.

10. The image intensifier binocular of claim 9, wherein the click stop (35) for viewing at long distances has a positive width for enabling fine adjustment.

11. The image intensifier binocular of claim 9, wherein the effective diameter of the entrance cathode is less than 13 mm.

12. The image intensifier binocular of claim 9, wherein the effective diameter of the entrance cathode is 12 mm.

13. An image intensifier binocular with unity enlargement comprising a single image intensifier tube provided with an entrance cathode and an exit screen, an objective in front of the entrance for focusing a scene thereon, an imaging system and two eyepieces, the imaging system being arranged to create images of the said exit screen and which are viewable through said eyepieces, said image intensifier tube being perpendicular to the line of sight of the binocular, the effective diameter of the entrance cathode being less than 15 mm.

14. The image intensifier binocular of claim 13, wherein the effective diameter of the entrance cathode is less than 13 mm.

15. The image intensifier binocular of claim 13, wherein the effective diameter of the entrance cathode is 12 mm.

16. The binocular of claim 1, wherein the available diameter of said entrance cathode is greater than the effective diameter.

17. The binocular of claim 13, wherein the available diameter of said entrance cathode is greater than the effective diameter.

* * * * *